United States Patent
Li et al.

(10) Patent No.: US 11,667,112 B2
(45) Date of Patent: Jun. 6, 2023

(54) EXTRUDED PRE-STRETCHED POLYETHYLENE FILMS

(71) Applicant: Inteplast Group Corporation, Livingston, NJ (US)

(72) Inventors: Jyh-Yao Raphael Li, Parisippany, NJ (US); Kelvin Yang, Madison, NJ (US); Nancy (Lan-Shin) Cheng, Livingston, NJ (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 0 days.

(21) Appl. No.: 17/331,315

(22) Filed: May 26, 2021

(65) Prior Publication Data

US 2021/0276315 A1 Sep. 9, 2021

Related U.S. Application Data

(62) Division of application No. 16/237,019, filed on Dec. 31, 2018, now Pat. No. 11,046,062.

(Continued)

(51) Int. Cl.
*B32B 27/32* (2006.01)
*B32B 7/035* (2019.01)
(Continued)

(52) U.S. Cl.
CPC .......... *B32B 27/32* (2013.01); *B29C 48/0018* (2019.02); *B29C 48/0022* (2019.02);
(Continued)

(58) Field of Classification Search
CPC ....... B32B 27/327; B32B 27/08; B32B 27/32; B32B 7/035; B32B 2553/00; B32B 2250/03; B32B 2264/10; B32B 2264/102; B32B 2307/514; B32B 27/205; B32B 2250/242; B32B 2264/025; B32B 2264/0264; B32B 2264/104;
(Continued)

(56) References Cited

U.S. PATENT DOCUMENTS 4,076,785 A   2/1978   Schmidt
4,377,616 A   5/1983   Ashcraft et al.
(Continued)

*Primary Examiner* — Jeffrey M Wollschlager
(74) *Attorney, Agent, or Firm* — Stinson LLP

(57) ABSTRACT

A method of making a pre-stretched plastic packaging film comprising co-extruding a top layer, a bottom layer, and a core layer into a multilayer film intermediate product, wherein the top layer and bottom layer comprise at least about 95 wt % polyethylene resin, and the core layer comprises polyethylene resin and filler particles; stretching the multilayer film intermediate product to impart cavitation in the core layer in the area of the filler particles to form a pre-stretched polyethylene-based film; and rolling the pre-stretched polyethylene-based film onto a roller to form a roll of pre-stretched polyethylene-based film. A multilayer pre-stretched plastic packaging film comprising: a core layer sandwiched between a top layer and a bottom layer wherein the top layer and bottom layer comprise at least about 95 wt % polyethylene, and the core layer comprises filler particles having a particle size of 0.1 to 20 μm in a polyethylene-based matrix comprising at least about 95 wt % polyethylene.

18 Claims, 3 Drawing Sheets

Related U.S. Application Data

(60) Provisional application No. 62/611,720, filed on Dec. 29, 2017.

(51) Int. Cl.
*C08L 23/06* (2006.01)
*B29C 48/00* (2019.01)
*B29C 48/21* (2019.01)
*B29C 48/28* (2019.01)
*C08K 3/013* (2018.01)

(52) U.S. Cl.
CPC ............ *B29C 48/022* (2019.02); *B29C 48/21* (2019.02); *B29C 48/28* (2019.02); *B32B 7/035* (2019.01); *C08L 23/06* (2013.01); *B29K 2023/06* (2013.01); *B32B 2553/00* (2013.01); *C08K 3/013* (2018.01); *C08K 2201/005* (2013.01)

(58) Field of Classification Search
CPC .......... B32B 2307/582; B29C 48/0018; B29C 48/0022; B29C 48/022; B29C 48/21; B29C 48/28; C08L 23/06; B29K 2023/06; C08K 3/013; C08K 2201/005
See application file for complete search history.

(56) References Cited

U.S. PATENT DOCUMENTS

| | | |
|---|---|---|
| 6,228,505 B1 * | 5/2001 | Agent ................... B32B 27/20 264/212 |
| 6,361,875 B1 | 3/2002 | Karaoglu et al. |
| 2003/0211350 A1 * | 11/2003 | Migliorini ............. B32B 27/32 428/500 |
| 2005/0064160 A1 | 3/2005 | Watson et al. |
| 2007/0141352 A1 * | 6/2007 | Calhoun ........... A61F 13/15699 428/480 |
| 2014/0265059 A1 | 9/2014 | Helmy et al. |
| 2016/0279913 A1 | 9/2016 | Manrique et al. |
| 2017/0129228 A1 * | 5/2017 | Middlesworth ......... B29C 55/18 |
| 2018/0272671 A1 | 9/2018 | Ambroise |

* cited by examiner

EXTRUDED PRE-STRETCHED POLYETHYLENE FILMS

REFERENCE TO RELATED APPLICATION

This application is a division of U.S. patent application Ser. No. 16/237,019, filed Dec. 31, 2018, which claims priority to U.S. provisional patent application 62/611,720 filed Dec. 29, 2017, the entire disclosure of each of which is expressly incorporated herein by reference.

FIELD OF THE INVENTION

The present invention generally relates to polyethylene-based films which have been subjected to a stretching operation prior to delivery to the ultimate user, and to a method for manufacturing such films. Such films are known in the industry most commonly as pre-stretch films, and are also sometimes referred to more literally as pre-stretched films, which is the term used in this application. These are also known as hand films or hand stretch films because they are especially suited for manual wrapping applications, as they require less energy to apply.

BACKGROUND OF THE INVENTION

A pre-stretched film is stretched close to its ultimate break point prior to being wound onto a roll. This means the film requires less stretching by the user, and less stretching energy, than with a standard stretch film to achieve the same wrapping force. Pre-stretched films are therefore popular for manual wrapping applications.

SUMMARY OF THE INVENTION

Briefly, therefore, the invention is directed to a method of making a pre-stretched plastic packaging film comprising co-extruding a top layer, a bottom layer, and a core layer into a multilayer film intermediate product, wherein the top layer and bottom layer comprise at least about 95 wt % polyethylene resin, and the core layer comprises polyethylene resin and filler particles; stretching the multilayer film intermediate product to impart cavitation in the core layer in the area of the filler particles to form a pre-stretched polyethylene-based film; and rolling the pre-stretched polyethylene-based film onto a roller to form a roll of pre-stretched polyethylene-based film.

In another aspect, the invention is directed to a method of making a pre-stretched plastic packaging film comprising co-extruding a top layer, a bottom layer, and a core layer into a multilayer film intermediate product, wherein the core layer in the multilayer film intermediate product comprises alternating segments, when viewed in cross-section relative to a machine direction of the film, of i) filler-free segments comprising at least about 95 wt % polyethylene resin, and ii) filler-containing segments comprising about 2 to about 40 wt % filler particles having a particle size of between about 0.1 and about 20 µm in a polyethylene-based resin matrix comprising at least about 95 wt % polyethylene; cutting the multilayer film intermediate product into multilayer film intermediate product segments by cutting lengthwise parallel to a machine direction of the film; stretching the multilayer film intermediate product segments in a machine direction to increase a length of the intermediate multilayer film product segments in the machine direction by between 100% and 600% and to impart cavitation in the core layer in the area of the filler particles to form pre-stretched polyethylene-based film segments; and rolling the pre-stretched polyethylene-based film segments onto rollers to form rolls of pre-stretched polyethylene-based film.

The invention is also directed to a multilayer pre-stretched plastic packaging film comprising a core layer sandwiched between a top layer and a bottom layer; wherein the top layer and bottom layer comprise at least about 95 wt % polyethylene; and the core layer comprises filler particles having a particle size of 0.1 to 20 µm in a polyethylene-based matrix comprising at least about 95 wt % polyethylene.

Other objects and features will be in part apparent and in part pointed out hereinafter.

DETAILED DESCRIPTION OF PREFERRED EMBODIMENTS

The film of the invention is a pre-stretch polyethylene (PE) film that includes interior cavitation regions that increase the film yield by decreasing the film density, thereby reducing the PE material requirements for a film of given dimensions. The yield of a film of this type can be characterized as so many square inches of area for a film of a given thickness per pound of PE, or $in^2/lb$ ($m^2/kg$ in metric units). For example, one pound of PE extruded into a film of thickness 16 microns will typically yield a given film area X in int. This invention increases the yield to more than 1.1×, such as to more than 1.2×, or up to about 1.7×, for example. The invention accomplishes this by replacing a portion of the bulk film interior with cavitation comprising low density filler material and void space.

Figure 1:
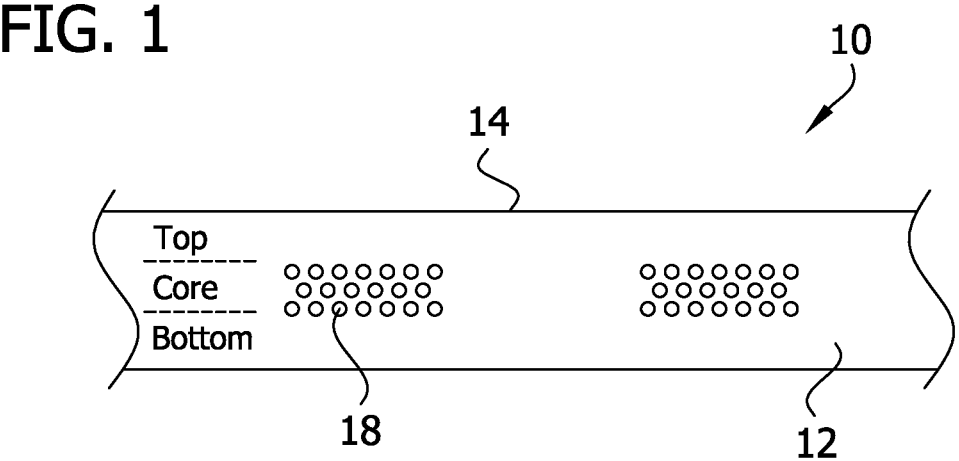
FIG. 1 is a schematic illustration of a film extruding according to the invention.

FIGS. 1 through 6 are end view cross-sectional views that demonstrate the manufacturing method of the invention. FIG. 1 is an end view of the film shown in cross-section, as the film is extruded in a machine direction toward the viewer. Film 10 includes a PE body defined between top surface 14 and bottom surface opposite from and parallel to the top surface. Within the film bulk body there are bulk PE regions 12 and filler particles 18. The film is co-extruded with top, bottom and core layers, as indicated in FIG. 1. The top and bottom layers may be extruded from separate extruders, or from the same extruder if these layers have the same composition as each other. The core layer is extruded from two extruders, one which extrudes the section of the core layer that includes the plastic resins with fillers 18 as shown in FIG. 1; and the other extruder which extrudes the sections to the left and right of the section that includes the fillers 18, that is, the other extruder which extrudes the solid plastic core sections. The process includes extruding different materials through a single die with orifices arranged so that the extrudates merge and weld together into a laminar structure. After extrusion, the film is then chilled and rolled onto a jumbo roller for holding as an intermediate product in the process of the invention; or fed directly to a subsequent manufacturing operation as described below.

Figure 2:
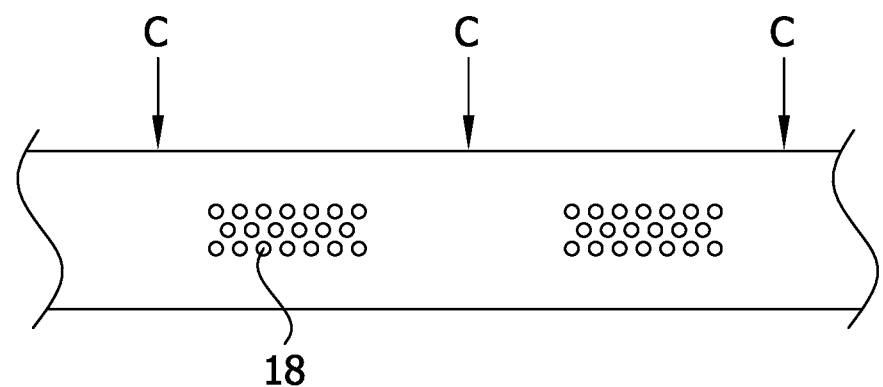
FIG. 2 is a schematic illustration of a film indicating cut lines to segregate the film into multiple segments.
Figure 3:
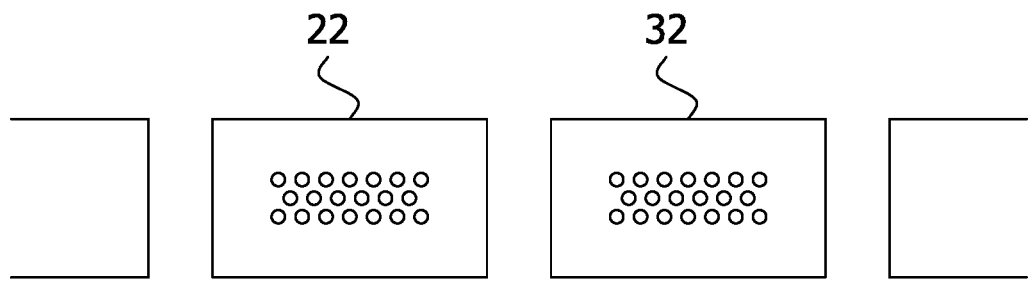
FIG. 3 is a schematic illustration of a film of the invention after slicing into multiple segments.

The next step in the process is cutting the film lengthwise in the machine direction at cut locations C illustrated in FIG. 2. This yields individual multilayer film intermediate product segments 22, 32, etc. shown in FIG. 3. Because the slices at C are performed through thicknesses of the film that do not intersect the fillers 18, the fillers are completely enclosed within the film bulk. Because the fillers are completed enclosed within the bulk PE regions 12, the film maintains good tear strength. In other words, before cutting, when viewed in cross-section relative to a machine direction of the film, the film has filler-free segments and filler-containing segments. The cutting is performed through filler-free segments. In this context, "filler-free" refers to the fact that these segments contain no fillers or at least so low of a content (e.g., <1 wt %) of the inorganic/organic fillers used to impart voiding in the filler-containing segments that there is less than 1% induced cavitation volume upon stretching. The multiple lengths of film resulting from this cutting operation are then optionally rolled onto rollers and stored as smaller rolls until it is time for stretching; or fed directly to stretching.

Figure 4:
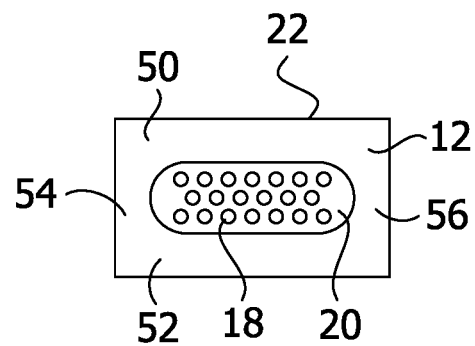
FIG. 4 is a schematic illustration of a film of the invention after stretching and cavitation.

The individual film segments such as 22 in FIG. 4 are stretched in the machine direction at a temperature below the PE melting temperature, which causes delamination of interfaces between the filler particles 18 and PE bulk region 12, thus producing cavitation volumes comprising the PE particles 18 within void spaces 20 as shown in FIG. 4. In one embodiment, for example, the film is stretched at a temperature between about ambient temperature and about 120° C. The amount of stretch imparted is between about 100% and about 600%, such as between about 200% and about 400%. In a preferred embodiment, the stretching in the machine direction is the only pre-stretching applied to the film. The solid edge sections to the left and right of the filler permit edge folding of the film as disclosed, for example, in U.S. Pat. No. 8,475,349. Areas 50 and 52 constitute continuous skin layers that protect the film from tears that might initiate from the top and bottom surface of the film. Areas 54 and 56 are continuous PE edge layers that protect the film from tears that might initiate along edges of the film.

It is alternatively contemplated to stretch the film prior to cutting the film into segments. In this alternative, stretching yields a pre-stretched polyethylene-based film which is then subsequently subjected to the cutting operation. The cutting operation then yields pre-stretched polyethylene-based film segments. Stretching a wider film prior to cutting, however, requires greater force, and can be more difficult to stretch uniformly.

Figure 5:
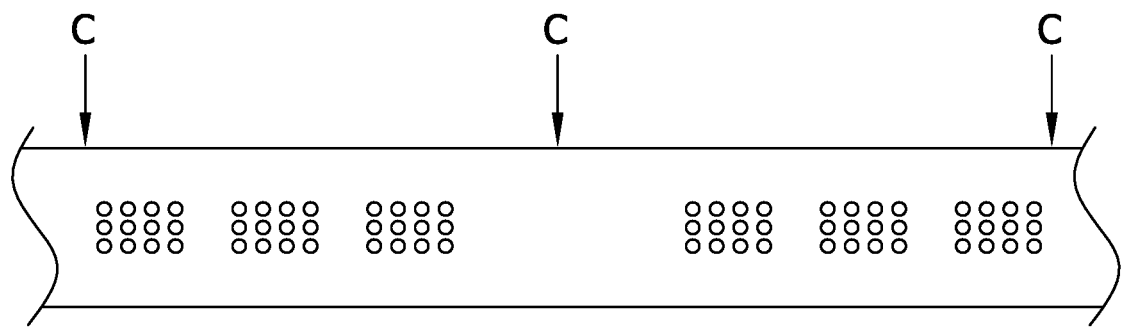
FIG. 5 is a schematic illustration of an alternative embodiment of a film extruded according to the invention.
Figure 6:
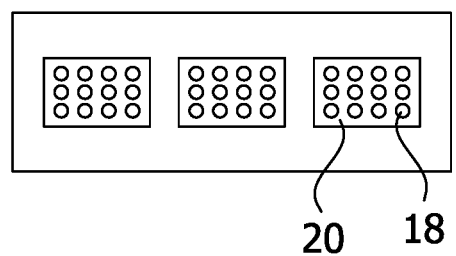
FIG. 6 is a schematic illustration of an alternative embodiment after slicing, stretching and cavitation.

FIGS. 5 and 6 illustrate a preferred embodiment of the invention in which the filler materials are extruded into sets of multiple narrow strips, such as sets of three strips as shown in FIG. 5, before slicing the film into film segments at C in FIG. 5. Then the ultimate film segment after stretching has the arrangement as schematically illustrated in FIG. 6, with void space 20 and filler particles 18.

As a general proposition, the thickness of film before stretching is in the range of about 5 to about 40 um, such as between about 10 and about 30 um. The top and bottom layers each constitute about from about 5 to about 25% of the total thickness, and the core layer as shown in FIGS. 1 and 5 that constitutes the depth of plastic that includes the filler particles constitutes from about 50 to about 90% of the overall thickness. After stretching and cavitation, depending on the percentage and size of fillers used and percentage of stretching, the density of the area that includes the void space 20 and filler particles 18 in FIG. 4 is about 50 to about 95% of the density of PE. The overall width of the cavitation area as viewed in FIG. 4 is between about 50 and about 98% of the overall width of the film segment 22. The cumulative width of the multiple (three) cavitation areas as viewed in FIG. 6 is between about 50 and about 95% of the overall width of the film segment. The overall finished film segment as shown in FIGS. 4 and 6 has a density which is between about 55% and about 98%, for example, of the density (e.g., 0.925 g/cm$^3$) of a film of the same PE-based material without the filler particles and cavitation.

The PE material used in extruding the films of the invention is PE plus optional conventional additives. For example, the material is LLDPE or a blend of PE materials, plus optional additives. The material used to extrude the filler-free top and bottom layers, as well as the filler-free core segments, for example, preferably comprises at least about 95 wt % PE material, plus optional additives. The material used to extrude the core segments that include the filler particles preferably comprises between about 2 and about 40 wt % filler particles, with the remainder being PE resin and optional additives.

The filler materials are inorganic particles such as calcium carbonate, talc, mica, or the like; or organic particles such as Nylon, PMMA (polymethyl methacrylate). The particle size of the filler materials is in the range of about 0.1 to about 20 μm.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

The invention claimed is:

1. A multilayer pre-stretched plastic packaging film comprising:
 a core layer sandwiched between a top layer and a bottom layer;
 wherein:
  the top layer and bottom layer comprise at least about 95 wt % polyethylene;
  the core layer comprises filler particles having a particle size of 0.1 to 20 μm in a polyethylene-based matrix comprising at least about 95 wt % polyethylene;
 wherein the multilayer pre-stretched plastic packaging film has:
  a length in the machine direction and
  a first side edge margin, a second side edge margin, and width extending from the first side edge margin to the second side edge margin, the width being perpendicular to the length;
 wherein the multilayer pre-stretched plastic packaging film has been cut lengthwise along the first side edge margin such that the first side edge margin comprises a cut edge;
 wherein the multilayer pre-stretched plastic packaging film comprises a filler-free segment and a filler-containing segment, the filler-free segment extending widthwise from the first side edge margin toward the second side edge margin and the filler-containing segment extending widthwise from the filler-free segment toward the second side edge margin, wherein the cut edge is through the filler-free segment.

2. The multilayer pre-stretched plastic packaging film as set forth in claim 1, wherein the filler-free segment is a first filler-free segment and wherein the cut edge is a first cut edge.

3. The multilayer pre-stretched plastic packaging film as set forth in claim 2, further comprising a second filler-free segment extending widthwise from the second side edge margin toward the first side edge margin, the filler-containing segment being between the first filler-free segment and the second filler-free segment.

4. The multilayer pre-stretched plastic packaging film as set forth in claim 3, wherein the multilayer pre-stretched plastic packaging film has been cut lengthwise along the second side edge margin such that the second side edge comprises a cut edge through the second filler-free segment.

5. The multilayer pre-stretched plastic packaging film as set forth in claim 4, wherein at least one of the first side edge margin and the second side edge margin is folded.

6. The multilayer pre-stretched plastic packaging film as set forth in claim 1, wherein the top layer is a continuous skin layer.

7. The multilayer pre-stretched plastic packaging film as set forth in claim 6, wherein the bottom layer is a continuous skin layer.

8. The multilayer pre-stretched plastic packaging film as set forth in claim 1, wherein the filler-containing segment comprises a set of multiple narrow strips of the filler.

9. The multilayer pre-stretched plastic packaging film as set forth in claim 1, wherein the filler-containing segment comprises a cavitated area between the top layer and the bottom layer.

10. The multilayer pre-stretched plastic packaging film as set forth in claim 9, wherein the cavitated area has a first density and non-cavitated polyethylene of the multilayer pre-stretched plastic packaging film has a second density, the first density being between about 50 and about 95% of the second density.

11. The multilayer pre-stretched plastic packaging film as set forth in claim 9, wherein the cavitated area has an area width and wherein the area width is about 50 to about 98% of the width of the multilayer pre-stretched plastic packaging film.

12. The multilayer pre-stretched plastic packaging film as set forth in claim 1, wherein the multilayer pre-stretched plastic packaging film is extruded from a specified polyethylene material.

13. The multilayer pre-stretched plastic packaging film as set forth in claim 12, wherein the multilayer pre-stretched plastic packaging film has an overall density and wherein the overall density is between about 55% and about 98% of a standard material density for a film of the specified polyethylene material devoid of filler particles and cavitation.

14. The multilayer pre-stretched plastic packaging film as set forth in claim 12, wherein the specified polyethylene material comprises additives.

15. The multilayer pre-stretched plastic packaging film as set forth in claim 1, wherein the filler particles are inorganic particles.

16. The multilayer pre-stretched plastic packaging film as set forth in claim 15, wherein the inorganic particles are at least one of calcium carbonate, talc, and mica.

17. The multilayer pre-stretched plastic packaging film as set forth in claim 1, wherein the filler particles are organic particles.

18. The multilayer pre-stretched plastic packaging film as set forth in claim 15, wherein the organic particles are at least one of Nylon and polymethyl methacrylate.

* * * * *